(12) United States Patent
Suzuki et al.

(10) Patent No.: US 12,522,929 B2
(45) Date of Patent: Jan. 13, 2026

(54) STEEL SHEET FOR HOT STAMPING AND HOT-STAMPED MEMBER

(71) Applicant: NIPPON STEEL CORPORATION, Tokyo (JP)

(72) Inventors: Yuki Suzuki, Tokyo (JP); Kenta Uenishi, Tokyo (JP); Soshi Fujita, Tokyo (JP); Masahiro Fuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 191 days.

(21) Appl. No.: 18/277,550

(22) PCT Filed: Apr. 8, 2021

(86) PCT No.: PCT/JP2021/014907
§ 371 (c)(1),
(2) Date: Aug. 16, 2023

(87) PCT Pub. No.: WO2022/215228
PCT Pub. Date: Oct. 13, 2022

(65) Prior Publication Data
US 2024/0044012 A1  Feb. 8, 2024

(51) Int. Cl.
*B32B 15/18* (2006.01)
*C22C 38/00* (2006.01)
(Continued)

(52) U.S. Cl.
CPC .......... *C23C 28/042* (2013.01); *C22C 38/001* (2013.01); *C22C 38/002* (2013.01);
(Continued)

(58) Field of Classification Search
CPC .......... C21D 6/08; C21D 8/005; C21D 10/00; C21D 2201/02; B32B 15/013; B32B 15/18
See application file for complete search history.

(56) References Cited

U.S. PATENT DOCUMENTS

| | | | |
|---|---|---|---|
| 2012/0135263 | A1 | 5/2012 | Kobayashi et al. |
| 2014/0048181 | A1 | 2/2014 | Banik et al. |

(Continued)

FOREIGN PATENT DOCUMENTS

| | | |
|---|---|---|
| EP | 3 733 321 A1 | 11/2020 |
| JP | 2000-107683 A | 4/2000 |

(Continued)

*Primary Examiner* — Hoa (Holly) Le
(74) *Attorney, Agent, or Firm* — Birch, Stewart, Kolasch & Birch, LLP (57) ABSTRACT

To provide a steel sheet for hot stamping suitable for manufacturing, through hot-stamping working, a component having portions with different strengths, and a hot-stamped member having portions with different strengths. A steel sheet for hot stamping according to the present invention includes, on a surface of the steel sheet: a site having a surface-treated film whose emissivity at a wavelength of 8.0 μm at 25° C. is 60% or more; and a site at which the surface-treated film is not provided, in which the surface-treated film contains carbon black, and one or more of oxides selected from a group consisting of a Zr oxide, a Zn oxide, and a Ti oxide, in which the carbon black and the oxides exist while being dispersed over the entire surface-treated film, the surface-treated film has a silica content of 0 to 0.3 g/m², and when an adhesion amount of the carbon black and an adhesion amount of the oxides are set to $X_{CB}$ (g/m²) and $X_{Oxide}$ (g/m²), respectively, an equation (1) below is satisfied.

8 Claims, 1 Drawing Sheet

(51) Int. Cl.

| | |
|---|---|
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C22C 38/16* | (2006.01) |
| *C22C 38/24* | (2006.01) |
| *C22C 38/28* | (2006.01) |
| *C22C 38/32* | (2006.01) |
| *C22C 38/38* | (2006.01) |
| *C22C 38/50* | (2006.01) |
| *C22C 38/54* | (2006.01) |
| *C23C 28/04* | (2006.01) |

(52) U.S. Cl.
CPC .......... *C22C 38/005* (2013.01); *C22C 38/008* (2013.01); *C22C 38/02* (2013.01); *C22C 38/04* (2013.01); *C22C 38/06* (2013.01); *C22C 38/12* (2013.01); *C22C 38/14* (2013.01); *C22C 38/16* (2013.01); *C22C 38/24* (2013.01); *C22C 38/28* (2013.01); *C22C 38/32* (2013.01); *C22C 38/38* (2013.01); *C22C 38/50* (2013.01); *C22C 38/54* (2013.01)

(56) References Cited

U.S. PATENT DOCUMENTS

| | | |
|---|---|---|
| 2016/0010171 A1 | 1/2016 | Naitou et al. |
| 2018/0030568 A1 | 2/2018 | Okita et al. |
| 2018/0044809 A1* | 2/2018 | Kawamura .......... B21D 22/022 |
| 2018/0079174 A1 | 3/2018 | Kawamura et al. |

FOREIGN PATENT DOCUMENTS

| | | |
|---|---|---|
| JP | 2011-149084 A | 8/2011 |
| JP | 2011-152589 A | 8/2011 |
| JP | 2014-161854 A | 9/2014 |
| JP | 2016-41440 A | 3/2016 |
| WO | WO 2016/139953 A1 | 9/2016 |

\* cited by examiner

STEEL SHEET FOR HOT STAMPING AND HOT-STAMPED MEMBER

TECHNICAL FIELD

The present invention relates to a steel sheet for hot stamping and a hot-stamped member.

BACKGROUND ART

In recent years, a demand for suppressing chemical fuel consumption is increasing for protecting environment and preventing global warming, and this demand exerts an influence on various manufacturing industries. For example, an automobile that is indispensable for daily lives and activities as a transport means, is also not an exception, and it is required to realize improvement of fuel efficiency and the like by a reduction in weight of vehicle body and the like. However, in an automobile, realization of a simple reduction in weight of vehicle body may reduce safety, which is therefore not allowed in terms of product quality. Accordingly, when performing a reduction in weight of vehicle body, it is required to secure proper safety.

Many of structures of an automobile are formed of iron, particularly steel sheets, and a reduction in weight of steel sheets is important for a reduction in weight of vehicle body. Further, such a demand for steel sheets is made in not only an automobile manufacturing industry but also various manufacturing industries. In response to such a demand, if a weight of steel sheet is simply reduced, it can be considered to reduce a sheet thickness of the steel sheet. However, the reduction in sheet thickness of the steel sheet leads to a reduction in strength of a structure. Accordingly, in recent years, research and development are conducted regarding a steel sheet whose mechanical strength is increased so that even if its thickness is made thinner than a previously-used steel sheet, it can maintain or increase mechanical strength of a structure composed of the steel sheet.

Generally, in a material having high mechanical strength, shape fixability tends to be lowered during molding working such as bending. Accordingly, when the material is worked into a complicated shape, it becomes difficult to perform the working itself. As one of measures for solving the problem regarding the moldability, there can be cited a so-called "hot stamping method (also called a hot pressing method, a hot press method, a high-temperature pressing method, or a die-quenching method)." In this hot stamping method, a material being a molding target is heated to a high temperature to be transformed into a structure called austenite (austenitized), the steel sheet softened by the heating is molded by press working, and cooling is performed after the molding. According to this hot stamping method, the material is once heated to a high temperature to be softened, and thus the material can be easily subjected to the press working. Besides, the mechanical strength of the material can be increased by a quenching effect of the cooling after the molding. Therefore, by using this hot stamping method, it is possible to obtain a molded product having favorable shape fixability and high mechanical strength.

Meanwhile, depending on components, it is sometimes required to have both a portion with high strength and a portion with low strength. This is because, although high strength is required for personnel protection, a portion that is not used for personnel protection is required to have relatively low strength for absorbing energy during collision.

From the viewpoints as described above, for example, Patent Document 1 below describes a component obtained by joining at least two kinds of Zn-based plated steel sheets with different steel components. Further, Patent Document 2 below describes a technique in which an average cooling rate and a cooling stop temperature are differentiated depending on locations on a steel sheet, to thereby make different structures after cooling. Further, Patent Document 3 below describes a technique in which a temperature of a metal mold is controlled to anneal a part of location after a martensite transformation, to thereby enhance ductility.

PRIOR ART DOCUMENT

Patent Document

Patent Document 1: International Publication Pamphlet No. WO 2016/139953
Patent Document 2: Japanese Laid-open Patent Publication No. 2014-161854
Patent Document 3: Japanese Laid-open Patent Publication No. 2016-41440

DISCLOSURE OF THE INVENTION

Problems to be Solved by the Invention

However, in order to manufacture the component as described in the above Patent Document 1, it is required to manufacture the steel sheets with different strengths, so that a load in manufacturing is increased, and besides, the joining step is required, which is not economical.

Further, the use of the method as described in the above Patent Document 2 is not preferable since two kinds of metal molds for cooling are required, which is economically disadvantageous, and it becomes difficult to secure manufacturing robustness.

Further, even in the case of using the technique described in the above Patent Document 3, it becomes difficult to secure manufacturing robustness similarly to the above Patent Document 2, which is not preferable.

As described above, under the present circumstances, a technique capable of performing hot-stamping working while realizing suppression in cost increase and securement of robustness of products is desired. Accordingly, the present invention has been made in view of the above-described problems, and an object thereof is to provide a steel sheet for hot stamping suitable for manufacturing, through hot-stamping working, a component having portions with different strengths, and a hot-stamped member having portions with different strengths.

Means for Solving the Problems

The present inventors conducted earnest studies for manufacturing a metal component having portions with different strengths by solving the above-described problems, and consequently, they came up with an idea of increasing a temperature increasing rate (heating rate) by providing a surface-treated film with high emissivity on a part of a surface of a steel sheet.

By providing a surface-treated film that enhances emissivity on a part of a steel sheet, it is possible to differentiate heating rates during hot-stamping heating. The steel sheet for hot stamping having such a characteristic is taken out of a heating furnace in a state where austenitizing is completed at the film-provided portion, and austenitizing remains incomplete at the other portion, and is then rapidly cooled by a metal mold. As a result of this, there is generated a difference in quenching properties between the film-provided portion and the other portion, which makes it possible to manufacture a component derived from the steel sheet having the portions with different strengths.

The present invention has been made based on the above findings obtained by the present inventors, and the gist of the present invention is as follows.

[1] A steel sheet for hot stamping includes, on a surface of the steel sheet: a site having a surface-treated film whose emissivity at a wavelength of 8.0 μm at 25° C. is 60% or more; and a site at which the surface-treated film is not provided, in which the surface-treated film contains carbon black, and one or more of oxides selected from a group consisting of a Zr oxide, a Zn oxide, and a Ti oxide, in which the carbon black and the oxides exist while being dispersed over the entire surface-treated film, the surface-treated film has a silica content of 0 to 0.3 g/m², and when an adhesion amount of the carbon black and an adhesion amount of the oxides are set to $X_{CB}$ (g/m²) and $X_{Oxide}$ (g/m²), respectively, an equation (1) below is satisfied.

$$118.9 \leq 24280/\{6700/(100+76 \times X_{CB})+18000/(130+65 \times X_{Oxide})\} \leq 332.0 \quad \text{Equation (1)}$$

[2] In the steel sheet for hot stamping described in [1], the surface-treated film contains the carbon black of 5.0 to 40.0 vol %, and contains the oxides of 1.0 to 30.0 vol %.

[3] In the steel sheet for hot stamping described in [1] or [2], a ratio $X_{Oxide}/X_{CB}$ between the adhesion amount $X_{CB}$ (g/m²) of the carbon black and the adhesion amount $X_{Oxide}$ (g/m²) of the oxides is 0.20 or more and 200.00 or less.

[4] In the steel sheet for hot stamping described in any one of [1] to [3], the adhesion amount $X_{CB}$ of the carbon black is 0.030 g/m² or more, and the adhesion amount $X_{Oxide}$ of the oxides is 0.030 g/m² or more.

[5] In the steel sheet for hot stamping described in any one of [1] to [4], an emissivity of the surface-treated film at a wavelength of 8.0 μm at 700° C. is 60% or more.

[6] In the steel sheet for hot stamping described in any one of [1] to [5], on one side or both sides of the steel sheet for hot stamping, a metal-plated layer is provided between a base material of the steel sheet and the surface-treated film.

[7] A hot-stamped member includes, on a surface of a steel sheet: a site having a surface-treated film; and a site at which the surface-treated film is not provided, in which the surface-treated film contains one or more of oxides selected from a group consisting of a Zr oxide, a Zn oxide, and a Ti oxide, in which an adhesion amount $X_{Oxide}$ of the oxides is 0.030 g/m² or more, and the surface-treated film has a silica content of 0 to 0.3 g/m².

[8] In the hot-stamped member described in [7], when a Vickers hardness defined by JIS Z 2244 (2009) is measured, a site indicating a maximum hardness HVmax and a site indicating a minimum hardness HVmin exist, and a hardness difference ΔHV between the maximum hardness HVmax and the minimum hardness HVmin is 150 or more.

[9] In the hot-stamped member described in [8], both the site indicating the maximum hardness HVmax and the site indicating the minimum hardness HVmin exist within a region composed of a common material.

Effect of the Invention

As described above, according to the present invention, it becomes possible to provide a steel sheet for hot stamping suitable for manufacturing a component having portions with different strengths, and a hot-stamped member having portions with different strengths.

EMBODIMENTS FOR CARRYING OUT THE INVENTION

Hereinafter, preferred embodiments of the present invention will be described in detail while referring to the attached drawings.

(Steel Sheet for Hot Stamping)

A steel sheet for hot stamping according to an embodiment of the present invention to be described below, is suitable for manufacturing a component having portions with different strengths. Such a steel sheet for hot stamping has, on a surface of the steel sheet, a site having a surface-treated film whose emissivity at a wavelength of 8.0 μm at 25° C. is 60% or more, and a site at which such a surface-treated film is not provided. In the present embodiment, by providing the surface-treated film on a part of the steel sheet as described above, it is possible to increase the emissivity at the wavelength of 8.0 μm at 25° C. to 60% or more.

In the steel sheet for hot stamping according to the present embodiment, a kind of a steel sheet to be a base metal (base steel sheet) is not particularly limited. As such a steel sheet, there can be cited, for example, various hot-rolled steel sheets, cold-rolled steel sheets, and plated steel sheets. The plated steel sheets include steel sheets on which, for example, hot-dip aluminum plating, hot-dip galvanizing, alloying hot-dip galvanizing, electrogalvanizing, or the like is performed, but not limited to these plated steel sheets as long as they can be applied to hot stamping.

Conventionally, many of steel sheets used as automotive framework components and the like have been hot-rolled steel sheets, cold-rolled steel sheets, or plated steel sheets after being subjected to plating of aluminum, zinc, or the like. These steel sheets have low emissivity, and thus a heating rate thereof with respect to radiation heating at a wavelength of approximately 8.0 μm is low.

Figure 1:
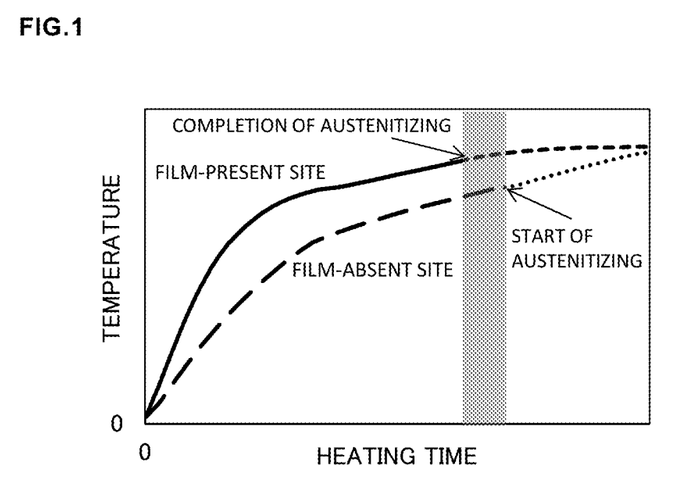
FIG. 1 is a view schematically illustrating a start time and a completion time of austenitizing at a film-present site and a film-absent site during hot-stamping heating.

In the present embodiment, by providing a specific surface-treated film only on a part of a surface of the steel sheet, a heating rate of a film-present portion during hot-stamping heating is increased, as schematically illustrated in FIG. 1. Hot stamping is performed on the steel sheet after the film-present portion has a temperature of Ac3 point or higher and a film-absent portion reaches a temperature of less than the Ac3 point, which enables to make the film-present portion locally turn into a quenched structure (martensite structure).

In the present embodiment, the surface-treated film with high emissivity is provided on a part of the surface of the steel sheet. Concrete methods for providing the surface-treated film include a method of painting, laminating, or the like, but not limited to these methods. The surface-treated film as described above may be provided only on one side of the steel sheet or both sides of the steel sheet. The emissivity at the wavelength of 8.0 μm at 25° C. of a region provided with the surface-treated film, of the surface of the steel sheet, is 60% or more. The emissivity at the wavelength of 8.0 μm at 25° C. of the region provided with the surface-treated film, is preferably 70% or more, and more preferably 80% or more.

Note that a measurement method of the emissivity can be conducted according to JIS R 1801 (2002) of Japanese Industrial Standards. In this case, a sample is set to a Fourier transform infrared spectrophotometer, and radiation intensity at a wavelength of 8.0 μm at 25° C. is measured, to thereby calculate an emissivity.

Further, it is also possible that a radiation thermometer in which a measuring wavelength is set to 8.0 μm is used to measure radiation intensity of a focused site at 25° C., and an emissivity is calculated from a ratio with respect to radiation intensity of a blackbody.

When the surface-treated film is provided only on a part of the surface of the steel sheet through painting, the surface-treated film can be provided in a manner that, for example, a part of the surface of the steel sheet is painted with an organic or inorganic treatment solution containing carbon black and metal oxides by a roll coater or a curtain coater, and then a volatile component in the treatment solution is dried. Further, a part of the steel sheet is covered with a polyester tape or another material and then subjected to painting using the above treatment solution, which enables to provide a film on an arbitrary portion of the surface of the steel sheet.

In painting by ink jet, in particular, the treatment solution can be applied at an arbitrary position with high accuracy, and besides, it is also possible to continuously change a film thickness.

<Surface-Treated Film>

In the steel sheet for hot stamping according to the present embodiment, the emissivity at the wavelength of 8.0 μm at 25° C. of the portion provided with the surface-treated film, is 60% or more. When the emissivity at the wavelength of 8.0 μm at 25° C. becomes less than 60%, a difference in heating rate with respect to the portion at which the surface-treated film is not provided becomes small. Consequently, a hardness difference after heating and cooling in hot stamping cannot be secured, and a degree of freedom regarding a timing of taking the steel sheet out of a heating furnace for securing the hardness difference is lowered to apply a load in manufacturing, which makes it difficult to realize both a reduction in weight and safety performance as an automotive component. The emissivity at the wavelength of 8.0 μm at 25° C. is preferably 80% or more. When the emissivity at the wavelength of 8.0 μm at 25° C. becomes 80% or more, the above-described hardness difference becomes more easily secured, and the load in manufacturing can be further reduced. Note that the emissivity at the wavelength of 8.0 μm at 25° C. of the portion provided with the surface-treated film is preferably as high as possible, and its upper limit value is not defined and may be 100%.

In order to make the emissivity at the wavelength of 8.0 μm at 25° C. to be 60% or more, the surface-treated film according to the present embodiment contains carbon black and specific metal oxides as will be described in detail hereinbelow. Further, the surface-treated film according to the present embodiment may further contain a binder component, various additives, and the like according to need. Besides, the surface-treated film according to the present embodiment may not contain silica, or it may contain silica within a certain range. It becomes possible to realize the desired emissivity by adjusting contents of the carbon black, the metal oxides, and the like, a film thickness of the surface-treated film, and so on.

More specifically, the surface-treated film according to the present embodiment contains carbon black, and one or more of oxides selected from a group consisting of a Zr oxide, a Zn oxide, and a Ti oxide, in which the carbon black and the oxides exist while being dispersed over the entire surface-treated film. Further, when an adhesion amount of the carbon black is expressed as $X_{CB}$ (g/m$^2$), and an adhesion amount of the oxides is expressed as $X_{Oxide}$ (g/m$^2$), the surface-treated film according to the present embodiment satisfies a relation expressed by an equation (1) below.

$$118.9 \leq 24280/\{6700/(100+76 \times X_{CB})+18000/(130+65 \times X_{Oxide})\} \leq 332.0 \quad \text{Equation (1)}$$

The above (equation 1) defines a relational expression between an increase factor (%) of the heating rate (° C./s) and the adhesion amounts of the carbon black and the oxides. More specifically, the equation formulates the fact that, regarding the increase factor of the heating rate, the carbon black functions as a heat absorption material within a range of up to 700° C., and in a range of 700° C. or more, the Zr oxide, the Zn oxide, and the Ti oxide that remain even in such a temperature zone function as a heat absorption material.

As briefly described before, the surface-treated film according to the present embodiment can be formed by applying a treatment solution containing the carbon black and the specific oxides to a desired site of the steel sheet. As a result of this, in the surface-treated film according to the present embodiment, the carbon black and the oxides exist while being dispersed over the entire surface-treated film. When the carbon black and the oxides exist while being dispersed over the entire surface-treated film, the emissivity of the surface-treated film at the wavelength of 8.0 μm at 25° C. can be uniformized over the entire film. Consequently, when performing hot stamping on the site provided with the surface-treated film according to the present embodiment, heating with no unevenness can be performed over the entire surface-treated film.

Such a distribution state of the carbon black and the oxides can be checked by performing, with the use of an EPMA (Electron Probe Micro Analyzer), plane analysis on the surface-treated film regarding an element derived from the carbon black (C, for example), and elements derived from the oxides (namely, Zr, Zn, and Ti)).

Note that when a treatment solution containing the carbon black and a treatment solution containing the oxides are separately prepared, and these treatment solutions are separately applied to form a stacked film, the carbon black and the oxides do not exist while being dispersed over the entire film. Further, when the film is tried to be formed by using the plurality of treatment solutions as above, the film of the second layer has to be formed after the formation of the film of the first layer, which increases not only the size of a manufacturing facility but also a manufacturing cost.

Further, regarding the surface-treated film according to the present embodiment, when the adhesion amount $X_{CB}$ of the carbon black and the adhesion amount $X_{Oxide}$ of the oxides satisfy the relation expressed by the above equation (1), the emissivity at the wavelength of 8.0 μm at 25° C. becomes 60% or more, resulting in that the difference in heating rate with respect to the site at which the surface-treated film does not exist, becomes noticeable. When a value defined by a middle term of the above equation (1) becomes less than 118.9, the adhesion amounts of the carbon black and the oxides are insufficient, resulting in that the emissivity as described above cannot be realized. The value defined by the middle term of the above equation (1) is preferably 119.0 or more, more preferably 170.0 or more, and still more preferably 220.0 or more. On the other hand, it is not preferable that the value defined by the middle term of the above equation (1) exceeds 332.0, since the adhesiveness of the film is lowered. The value defined by the middle term of the above equation (1) is preferably 330.0 or less, more preferably 310.0 or less, and still more preferably 300.0 or less.

Here, the adhesion amount $X_{CB}$ of the carbon black in the surface-treated film can be measured as follows by a cross-sectional analysis of the surface-treated film by using a TEM (Transmission Electron Microscope). Specifically, a range of a region expressed by a film thickness×5 μm is subjected to a cross-sectional analysis based on a TEM-EDS analysis, to thereby measure a film thickness of the surface-treated film and an area ratio occupied by particles whose carbon content becomes 70 mass % or more. When the film thickness is set to d (μm), and the area ratio is set to a (%), a value expressed by d×a corresponds to the adhesion amount $X_{CB}$ (g/m$^2$) of the carbon black.

Further, the adhesion amount $X_{Oxide}$ of the oxides of at least one kind of elements of Zr, Zn, and Ti in the surface-treated film, means an amount of a Zr oxide, a Zn oxide, and a Ti oxide (namely, $ZrO_2$, ZnO, and $TiO_2$) adhered per unit area as metal Zr, metal Zn, and metal Ti. The adhesion amount $X_{Oxide}$ of these oxides can be determined in a manner that a fluorescent X-ray analysis apparatus (ZSX Primus manufactured by Rigaku Corporation) is used to perform an elemental analysis from a surface of the surface-treated film, thereby determining quantities of the metal Zr, the metal Zn, and the metal Ti.

The steel sheet for hot stamping according to the present embodiment has the characteristic as described above, and thus it is possible to make an emissivity at a wavelength of 8.0 μm at 700° C. to be 60% or more. Hereinafter, the substances contained by the surface-treated film and characteristic for realizing the emissivity as described above, will be described in more detail.

<<Carbon Black>>

At the site provided with the surface-treated film, of the surface of the steel sheet, the adhesion amount $X_{CB}$ of the carbon black in the surface-treated film is preferably 0.030 g/m$^2$ or more. By making the adhesion amount $X_{CB}$ to be 0.030 g/m$^2$ or more, it is possible to securely increase the heating rate in a region of up to 700° C. The adhesion amount $X_{CB}$ is more preferably 0.100 g/m$^2$ or more. On the other hand, an upper limit value of the adhesion amount $X_{CB}$ becomes a value determined by the above equation (1). The adhesion amount $X_{CB}$ is preferably 0.800 g/m$^2$ or less, and more preferably 0.600 g/m$^2$ or less.

Further, it is more preferable that the surface-treated film contains the carbon black of 5.0 to 40.0 vol %. The carbon black brings about an effect of increasing the heating rate in a region of up to 700° C., in particular. A thickness of the surface-treated film is locally different in some cases according to roughness or undulation of a steel sheet, a difference in speed at which a volatile component such as water in the treatment solution volatilizes during the film formation, or the like. At this time, when the content of carbon black is 5.0 vol % or more, a difference between a portion observed to be blackish due to the carbon black and the other portion can be suppressed to keep design, which is preferable in appearance. On the other hand, when the content of carbon black in the surface-treated film is 40.0 vol % or less, it is possible to suppress a reduction in paint adhesiveness after performing hot-stamping heating. Although its mechanism is not clarified, it can be inferred that by suppressing the remainder of a compound derived from the remaining carbon black, an oxide of the carbon black, or the like, the prevention of joining between the paint and the base material is suppressed.

Further, since main components of the carbon black are carbon, hydrogen, and oxygen, the carbon black is eliminated when being heated to a high temperature. Accordingly, by making the carbon black to be contained in the surface-treated film, it is possible to maintain performance after the hot stamping such as post-painting adhesiveness.

When the content of carbon black is 5.0 vol % or more, oxidation of a steel sheet or a plated layer positioned at a lower layer of the surface-treated film is suppressed, so that reactivity when applying the paint (treatment agent) is secured, which realizes strong joining and thus keeps the paint adhesiveness. Further, the emissivity can be increased, and thus it is possible to increase the heating rate. The content of carbon black in the surface-treated film is more preferably 8.0 vol % or more. By making the content of carbon black in the surface-treated film to be 8.0 vol % or more, it becomes possible to further increase the heating rate. On the other hand, when the content of carbon black in the surface-treated film is 40.0 vol % or less, it is possible to suppress an increase in a film cost while sufficiently achieving an effect of increasing the emissivity. The content of carbon black in the surface-treated film is more preferably 30.0 vol % or less. By making the content of carbon black in the surface-treated film to be 30.0 vol % or less, it becomes possible to further suppress the film cost.

<<Metal Oxide>>

At the site provided with the surface-treated film, of the surface of the steel sheet, a total adhesion amount $X_{Oxide}$ of the Zr oxide, the Zn oxide, and the Ti oxide in the surface-treated film, is preferably 0.030 g/m$^2$ or more. By making the adhesion amount $X_{Oxide}$ to be 0.03 g/m$^2$ or more, it becomes possible to securely increase the heating rate in a region of 700° C. or more. The adhesion amount $X_{Oxide}$ is more preferably 0.060 g/m$^2$ or more. On the other hand, an upper limit value of the adhesion amount $X_{Oxide}$ becomes a value determined by the above equation (1). The adhesion amount $X_{Oxide}$ is preferably 0.500 g/m$^2$ or less, and more preferably 0.300 g/m$^2$ or less.

Further, it is more preferable that the surface-treated film contains the Zr oxide, the Zn oxide, and the Ti oxide by 1.0 to 30.0 vol % in total. These oxides of elements (namely, the metal oxides of Zr, Zn, and Ti) remain in the surface-treated film even in a case of being heated to a high temperature of 700° C. or more at which the effect of the carbon black becomes weak. As a result of this, at the site provided with the surface-treated film, an emissivity of these metal oxides is higher than that at the surface of the steel sheet or the plating surface at a high temperature of 700° C. or more, resulting in that an input heat amount by radiation heat from a heating atmosphere becomes large. This makes it possible to maintain an effect of increasing the heating rate even under a high temperature of 700° C. or more. When the content of these metal oxides is 1.0 vol % or more, it is possible to sufficiently achieve the effect of increasing the heating rate. The content of these metal oxides is more preferably 3.0 vol % or more. On the other hand, when the content of these metal oxides is 30 vol % or less, the film cost can be suppressed, which is economically preferable. The content of these metal oxides is more preferably 25.0 vol % or less.

Note that regarding content ratios (vol %) of the various compounds such as the carbon black and the metal oxides in the surface-treated film, a sample is embedded in a resin, a polished cross section is observed by a scanning electron microscope (SEM), and based on area ratios occupied with respect to the cross section, the content ratios can be calculated. Further, the compounds can be inferred by performing a quantitative analysis by using an EDX function provided to the SEM.

In the surface-treated film according to the present embodiment, a ratio $X_{Oxide}/X_{CB}$ between the adhesion amount $X_{CB}$ (g/m$^2$) of the carbon black and the adhesion amount $X_{Oxide}$ (g/m$^2$) of the oxides described above is preferably 0.20 or more and 200.00 or less. When the ratio $X_{Oxide}/X_{CB}$ falls within the above-described range, it becomes possible to perform more proper heating of the site provided with the surface-treated film. The ratio $X_{Oxide}/X_{CB}$ is more preferably 0.40 to 10.00, and still more preferably 0.60 to 5.00. Further, in the surface-treated film according to the present embodiment, various binder components and additives, other than the above-described carbon black and metal oxides, can be contained.

<<Binder Component>>

A binder component capable of being contained in the surface-treated film according to the present embodiment, is preferably a water-dispersible or water-soluble resin. A content of the binder component selected from the water-dispersible or water-soluble resin is preferably 40 vol % or more with respect to the entire volume of the surface-treated film.

As the binder component selected from the water-dispersible or water-soluble resin, it is possible to use publicly-known various resins that exhibit water dispersibility or water solubility. As such resins exhibiting the water dispersibility or the water solubility, there can be cited, for example, a polyurethane resin, a polyester resin, an acrylic resin, an epoxy resin, a fluorocarbon resin, a polyamide resin, a polyolefin resin, a polymer compound obtained through hydrolysis and condensation polymerization of a silane coupling agent, and the like. Such a binder component is more preferably one or two or more selected from a group consisting of the polyester resin, the polyurethane resin, the polyolefin resin, the acrylic resin, the epoxy resin, the fluorocarbon resin, and the polyamide resin. Note that when using a plurality of resins as the binder component, a total content of the used plurality of resins is regarded as the content of the binder component.

Note that when using the polyurethane resin as the binder component, the polyurethane resin is preferably a polyether-based polyurethane resin. This is because by using the polyether-based polyurethane resin, it is possible to prevent occurrence of hydrolysis due to acid or alkali when compared to a polyester-based polyurethane resin, and when compared to a polycarbonate-based polyurethane resin, it is possible to secure adhesiveness during working and corrosion resistance of a worked portion by suppressing formation of a hard and fragile film.

It is possible to determine whether or not the polyurethane resin is contained, based on whether or not characteristic absorption is observed at 3330 cm$^{-1}$ (N—H stretching), 1730 cm$^{-1}$ (C=O stretching), 1530 cm$^{-1}$ (C—N), and 1250 cm$^{-1}$ (C—O) in an infrared absorption spectrum obtained by infrared spectroscopy. Further, regarding the content of the polyurethane resin as well, by previously creating a calibration curve indicating a relation between a content and an intensity of characteristic absorption by using a sample whose content is already known, it is possible to specify the content from the obtained intensity of characteristic absorption.

Further, regarding the aforementioned resins other than the polyurethane resin as well, by focusing attention on characteristic absorption derived from a functional group peculiar to each resin, it is possible to determine whether or not the resin is contained and a content thereof, similarly to the aforementioned polyurethane resin.

<<Additive>>

It is possible that the surface-treated film according to the present embodiment contains, as additives when producing a treatment solution before forming the film, various additives such as a leveling agent, a water-soluble solvent, a metal stabilizer, and an etching inhibitor, within a range that does not impair the effect of the present invention.

As the leveling agent, there can be cited, for example, a polyethylene oxide or polypropylene oxide adduct, an acetylene glycol compound, and the like, as a nonionic or cationic surface active agent.

As the water-soluble solvent, there can be cited, for example, alcohols such as ethanol, isopropyl alcohol, t-butyl alcohol, and propylene glycol, cellosolves such as ethylene glycol monobutyl ether and ethylene glycol monoethyl ether, esters such as ethyl acetate and butyl acetate, ketones such as acetone, methyl ethyl ketone, and methyl isobutyl ketone, and the like.

As the metal stabilizer, there can be cited, for example, chelate compounds such as EDTA (ethylenediamine tetraacetic acid) and DTPA (diethylenetriamine pentaacetic acid).

As the etching inhibitor, there can be cited, for example, amine compounds such as ethylenediamine, triethylenepentamine, guanidine, and pyrimidine.

Note that contents of the above-described binder component and additives can also be measured similarly to the case of the carbon black and the metal oxides.

<<Silica>>

As mentioned before, the surface-treated film according to the present embodiment may not contain silica, or it may contain silica within a certain range. More specifically, in the surface-treated film according to the present embodiment, a silica content is 0 to 0.3 g/m$^2$. When the silica of greater than 0.3 g/m$^2$ is contained, a cost is increased even though the temperature increasing effect cannot be expected, which is not economically preferable. Further, the silica is a substance with low electrical conduction, so that the silica content of greater than 0.3 g/m$^2$ is not preferable in terms of weldability after hot stamping. When the silica is contained in the surface-treated film, the silica content is preferably as small as possible. The silica content in the surface-treated film is more preferably 0.10 g/m$^2$ or less, and still more preferably 0.05 g/m$^2$ or less.

<<Film Thickness of Surface-Treated Film>>

A film thickness of the surface-treated film containing the components as described above, is preferably set to 0.5 to 5.0 µm, for example. By making the film thickness of the surface-treated film fall within the above-described range, the emissivity at the wavelength of 8.0 µm at 25° C. can be more securely set to 60% or more. The film thickness of the surface-treated film is more preferably 1.0 to 3.0 µm.

<Metal-Plated Layer>

The steel sheet for hot stamping according to the present embodiment preferably has a metal-plated layer at at least a part between the base steel sheet and the surface-treated film, on one side or both sides of such a steel sheet for hot stamping. By providing the metal-plated layer, it is possible to further improve post-painting corrosion resistance after hot stamping. Further, because of the presence of metal-plated layer, it is possible to prevent generation of iron scale due to heating, at the time of hot stamping. The iron scale contaminates a heating furnace or adheres to a roll used for conveyance, and thus it becomes a load in manufacturing. Accordingly, when the iron scale is generated, a process such as shot blast is required for removing the iron scale, which is not economically preferable.

A type of the metal-plated layer is not limited in particular. As the metal plating forming such a metal-plated layer, there can be cited, for example, aluminum plating, Al—Si plating, galvanizing, alloying galvanizing, Zn—Ni plating, Zn—Al—Mg plating, Zn—Al—Mg—Si plating, and the like.

Further, as a method of forming the metal-plated layer, there can be cited a hot dipping method, an electroplating method, physical vapor deposition, chemical vapor deposition, and so on, but not limited in particular.

<Base Steel Sheet>

Next, the base steel sheet of the steel sheet for hot stamping according to the present embodiment is not limited in particular as long as it is a steel sheet capable of being favorably used for the hot stamping method. As a steel sheet capable of being applied to the steel sheet for hot stamping according to the present embodiment, there can be exemplified, for example, a steel sheet whose chemical components contain, by mass %, C: 0.10 to 0.40%, Si: 0.01 to 0.60%, Mn: 0.50 to 3.00%, P: 0.05% or less, S: 0.020% or less, Al: 0.10% or less, Ti: 0.01 to 0.10%, B: 0.0001 to 0.0100%, and N: 0.010% or less, with the balance made up of Fe and impurities. Further, as a form of the base steel sheet, there can be exemplified a steel sheet such as a hot-rolled steel sheet or a cold-rolled steel sheet, for example. Hereinafter, the chemical components of the base steel sheet will be described in detail. Note that in the following explanation regarding the chemical components of the base steel sheet, the description of "%" means "mass %" unless otherwise specified.

[C: 0.10 to 0.40%]

C is contained for securing intended mechanical strength. When a C content is 0.10% or more, it is possible to sufficiently improve the mechanical strength, and an effect of containing C can be sufficiently achieved. Accordingly, the C content is preferably 0.10% or more. The C content is more preferably 0.20% or more. On the other hand, when the C content is 0.40% or less, it is possible to suppress a reduction in elongation and drawing while hardening the steel sheet and improving the strength of the steel sheet. For this reason, the C content is preferably 0.40% or less. The C content is more preferably 0.35% or less.

[Si: 0.01 to 0.60%]

Si is one of strength improving elements that improve the mechanical strength, and is contained for securing the intended mechanical strength, similarly to C. When a Si content is 0.01% or more, a strength improving effect is sufficiently exhibited, and it is possible to sufficiently improve the mechanical strength. Accordingly, the Si content is preferably 0.01% or more. The Si content is more preferably 0.10% or more. On the other hand, Si is also an easily oxidizable element, and thus when the Si content is 0.60% or less, a reduction in wettability at a time of performing molten Al plating due to an influence of Si oxides formed on a surface layer of the steel sheet is suppressed, which enables to suppress occurrence of unplating. For this reason, the Si content is preferably 0.60% or less. The Si content is more preferably 0.40% or less.

[Mn: 0.50 to 3.00%]

Mn is one of strengthening elements that strengthen steel, and is also one of elements that increase a quenching property. Besides, Mn is an element that is also effective for preventing hot shortness caused by S being one of impurities. When a Mn content is 0.50% or more, these effects can be sufficiently achieved. Accordingly, in order to make the above effects to be securely exhibited, the Mn content is preferably 0.50% or more. The Mn content is more preferably 0.80% or more. On the other hand, Mn is an austenite forming element, so that when the Mn content is 3.00% or less, an amount of a retained austenite phase does not become excessive, and a reduction in strength is suppressed. For this reason, the Mn content is preferably 3.00% or less. The Mn content is more preferably 1.50% or less.

[P: 0.05% or less]

P is an impurity contained in steel. When a P content is 0.05% or less, it is possible to suppress that P contained in a steel sheet segregates in a crystal grain boundary of the steel sheet to reduce toughness of a base metal of a hot-stamped molded body, and it is possible to suppress a reduction in delayed fracture resistance of the steel sheet. For this reason, the P content is preferably 0.05% or less, and the P content is preferably set to be as small as possible.

[S: 0.020% or less]

S is an impurity contained in steel. When a S content is 0.020% or less, it is possible to suppress that S contained in the steel sheet forms a sulfide to reduce toughness of the steel sheet, and it is possible to suppress a reduction in delayed fracture resistance of the steel sheet. For this reason, the S content is preferably 0.020% or less, and the S content is preferably set to be as small as possible.

[Al: 0.10% or less]

Al is generally used for the purpose of deoxidation of steel. On the other hand, when an Al content is 0.10% or less, an increase in Ac3 point of a steel sheet is suppressed, so that a heating temperature required for securing the quenching property of steel during hot stamping can be lowered, which is desirable in hot-stamping manufacturing. Therefore, the Al content in the steel sheet is preferably 0.10% or less, more preferably 0.05% or less, and still more preferably 0.01% or less.

[Ti: 0.01 to 0.10%]

Ti is one of strength enhancing elements. When a Ti content is or more, it is possible to sufficiently achieve a strength improving effect and an oxidation resistance improving effect. Accordingly, in order to make the above effects to be securely exhibited, the Ti content is preferably or more. The Ti content is more preferably 0.03% or more. On the other hand, when the Ti content is 0.10% or less, for example, formation of a carbide or a nitride is suppressed and softening of steel can be suppressed, resulting in that the intended mechanical strength can be sufficiently obtained. Therefore, the Ti content is preferably 0.10% or less. The Ti content is more preferably 0.08% or less.

[B: 0.0001 to 0.0100%]

B brings about an effect of improving strength by acting during quenching. When a B content is 0.0001% or more, such a strength improving effect can be sufficiently achieved. Accordingly, the B content is preferably 0.0001% or more. The B content is more preferably 0.0010% or more. On the other hand, when the B content is 0.0100% or less, formation of inclusions is reduced to suppress embrittlement of a steel sheet, and a reduction in fatigue strength can be suppressed. For this reason, the B content is preferably 0.0100% or less. The B content is more preferably or less.

[N: 0.010% or less]

N is an impurity contained in steel. When a N content is 0.010% or less, formation of a nitride caused by N contained in a steel sheet is suppressed, which enables to suppress a reduction in toughness of the steel sheet. Besides, when B is contained in the steel sheet, it is possible to suppress that N contained in the steel sheet bonds to B to reduce an amount of solid-solution B, resulting in that a reduction in a quenching property improving effect of B can be suppressed. For this reason, the N content is preferably 0.010% or less, and the N content is more preferably set to be as small as possible.

Further, the base steel sheet of the steel sheet for hot stamping according to the present embodiment may further contain, as optional additive elements, elements such as Cr, Mo, Ni, Co, Cu, Mo, V, Nb, Sn, W, Ca, REM, O, and Sb.

[Cr: 0 to 1.00%]

Cr is an element that improves the quenching property of a steel sheet. In order to sufficiently achieve such an effect, a Cr content is preferably set to or more. On the other hand, by setting the Cr content to 1.00% or less, it is possible to suppress an increase in cost while sufficiently achieving the effect. For this reason, when Cr is contained, the Cr content is preferably set to 1.00% or less.

[Ni: 0 to 2.00%]
[Co: 0 to 2.00%]

Ni and Co are elements capable of increasing the quenching property of steel, and stably securing strength of a steel sheet member after quenching. In order to make such effects to be sufficiently exhibited, a Ni content is preferably set to 0.10% or more, and a Co content is preferably set to 0.10% or more. On the other hand, when the Ni content and the Co content are respectively 2.00% or less, economic efficiency is increased while sufficiently achieving the above effects. For this reason, when Ni is contained, the Ni content is preferably set to 2.00% or less, and when Co is contained, the Co content is preferably set to 2.00% or less.

[Cu: 0 to 1.000%]

Cu is an element capable of increasing the quenching property of steel, and stably securing strength of a steel sheet member after quenching. Further, Cu improves pitting resistance under a corrosive environment. In order to make such effects to be sufficiently exhibited, a Cu content is preferably set to 0.100% or more. On the other hand, when the Cu content is 1.000% or less, economic efficiency is increased while sufficiently achieving the above effects. For this reason, when Cu is contained, the Cu content is preferably set to 1.000% or less.

[Mo: 0 to 1.00%]

Mo is an element capable of increasing the quenching property of steel, and stably securing strength of a steel sheet member after quenching. In order to make such effects to be sufficiently exhibited, a Mo content is preferably set to 0.10% or more. On the other hand, when the Mo content is 1.00% or less, economic efficiency is increased while sufficiently achieving the above effects. For this reason, when Mo is contained, the Mo content is preferably set to 1.00% or less.

[V: 0 to 1.00%]

V is an element capable of increasing the quenching property of steel, and stably securing strength of a steel sheet member after quenching. In order to make such effects to be sufficiently exhibited, a V content is preferably set to 0.10% or more. On the other hand, when the V content is 1.00% or less, economic efficiency is increased while sufficiently achieving the above effects. For this reason, when V is contained, the V content is preferably set to 1.00% or less.

[Nb: 0 to 1.00%]

Nb is an element capable of increasing the quenching property of steel, and stably securing strength of a steel sheet member after quenching. In order to make such effects to be sufficiently exhibited, a Nb content is preferably set to 0.01% or more. On the other hand, when the Nb content is 1.00% or less, economic efficiency is increased while sufficiently achieving the above effects. For this reason, when Nb is contained, the Nb content is preferably set to 1.00% or less.

[Sn: 0 to 1.00%]

Sn is an element that improves pitting resistance under a corrosive environment. In order to make such an effect to be sufficiently exhibited, a Sn content is preferably set to 0.01% or more. On the other hand, when the Sn content is 1.00% or less, a reduction in grain boundary strength is suppressed, which enables to suppress a reduction in toughness. For this reason, when Sn is contained, the Sn content is preferably set to 1.00% or less.

[W: 0 to 1.00%]

W is an element capable of increasing the quenching property of steel, and stably securing strength of a steel sheet member after quenching. Further, W improves pitting resistance under a corrosive environment. In order to make such effects to be sufficiently exhibited, a W content is preferably set to 0.01% or more. On the other hand, when the W content is 1.00% or less, economic efficiency is increased while sufficiently achieving the above effects. For this reason, when W is contained, the W content is preferably set to 1.00% or less.

[Ca: 0 to 0.010%]

Ca is an element that brings about an effect of making inclusions in steel to be fine to improve toughness and ductility after quenching. In order to make such effects to be sufficiently exhibited, a Ca content is preferably set to 0.001% or more, and more preferably set to 0.002% or more. On the other hand, when the Ca content is 0.010% or less, a cost can be suppressed while sufficiently achieving the effects. For this reason, when Ca is contained, the Ca content is preferably set to 0.010% or less, and more preferably set to 0.004% or less.

[REM: 0 to 0.30%]

REM is an element that brings about an effect of making inclusions in steel to be fine to improve toughness and ductility after quenching, similarly to Ca. In order to make such effects to be sufficiently exhibited, a REM content is preferably set to 0.001% or more, and more preferably set to or more. On the other hand, when the REM content is 0.30% or less, a cost can be suppressed while sufficiently achieving the effects. For this reason, when REM is contained, the REM content is preferably set to 0.30% or less, and more preferably set to 0.20% or less.

Here, REM indicates 17 elements in total of Sc, Y, and lanthanoid series, and the above-described REM content indicates a total content of these elements. REM is added to molten steel by using an Fe—Si-REM alloy, for example, and this alloy contains Ce, La, Nd, and Pr, for example.

[O: 0.0070% or less]

O is not an essential element, and is contained as an impurity in steel, for example. O is an element that causes property deterioration of a steel sheet by forming an oxide that becomes a starting point of fracture. Further, an oxide that exists in the vicinity of a surface of the steel sheet becomes a cause of surface flaw, and sometimes deteriorates an appearance grade. For this reason, an O content is preferably as low as possible. Particularly, when the O content is set to 0.0070% or less, the property deterioration can be suppressed, so that the O content is preferably 0.0070% or less. A lower limit of the O content is not particularly limited and may be set to 0%, but in an actual operation, a substantial lower limit of the O content in refining is

[Sb: 0.100% or Less]

A lower limit of a Sb content is not particularly limited, and may be set to 0%. Sb is an element effective for improving wettability and adhesiveness of plating. In order to achieve this effect, Sb is preferably contained by 0.001% or more. On the other hand, when the Sb content is set to 0.100% or less, it is possible to suppress a flaw generated during manufacturing, and it is also possible to suppress a reduction in toughness. For this reason, the content of Sb is preferably 0.100% or less.

The balance other than the above-described components is made up of Fe and impurities. The base steel sheet may also contain impurities that are inevitably mixed through a manufacturing process and the like. As such impurities, there can be cited Zn (zinc), for example.

The above is the detailed explanation regarding one example of the chemical components of the base steel sheet of the steel sheet for hot stamping according to the present embodiment.

When the site provided with the surface-treated film of the steel sheet having the above-described chemical components is subjected to heating and quenching according to the hot stamping method, it can be turned into a hot-stamped member having tensile strength of about 1000 MPa or more. Further, in the hot stamping method, it is possible to perform press working in a state where a steel sheet is softened at a high temperature, so that molding can be performed easily.

Regarding the steel sheet for hot stamping according to the present embodiment, when compared to a case where different kinds of steel sheets are welded to be hot-stamped, and a method of changing cooling rates depending on sites by temperature control of a metal mold, there is no need to use a plurality of steel sheets, and a facility and a process for performing welding beforehand are also not required. Further, a facility for changing a temperature of a metal mold and a running cost therefor are also not required. This is therefore economically preferable.

<Manufacture of Hot-Stamped Member Having Portions with Different Strengths>

In an automotive framework component, there is a case where strength of a part thereof is increased, and strength of the other part is lowered for the purpose of absorbing energy at a time of collision. The component having portions with different strengths as above can be manufactured by using the steel sheet for hot stamping formed with the region obtained by providing the surface-treated film on a part of the surface as described above.

First, the surface-treated film is provided on a part of a surface of a metal material such as, for example, a coiled steel sheet, to thereby previously form the site with different emissivity. Subsequently, various kinds of working such as cutting and press punching are performed, thereby obtaining the steel sheet for hot stamping according to the present embodiment. Further, it is possible to obtain the steel sheet for hot stamping according to the present embodiment also by providing the surface-treated film to the steel sheet obtained through the cutting, the press punching, or the like. Further, it is possible to continuously change the emissivity by changing the film thickness of the surface-treated film.

The steel sheet for hot stamping after being provided with the surface-treated film as described above, for example, is hot-stamped. As a heating apparatus, there can be cited an ordinary heating apparatus including, for example, an electric heating furnace, a gas heating furnace, a far infrared furnace, or an infrared heater, or the like. As illustrated in FIG. 1, the emissivity of the site provided with the surface-treated film (film-present site) is increased, and the heating rate of the site is fast since a heat transfer effect by radiation is large, but the heating rate of the other site (film-absent site) is slow. The film-present site that has been heated fast to have a high temperature, is heated to a temperature equal to or higher than an Ac3 point or more at which a metal structure transforms into an austenite phase. On the other hand, the film-absent site has a slow heating rate, and thus even when the temperature of the film-present site reaches the Ac3 point or higher, it is possible to keep the temperature of the film-absent site to less than the Ac3 point at which the metal structure does not completely transform into an austenite single phase. In the present embodiment, the heating apparatus to be used and the like may be properly controlled so as to realize the above-described state.

Next, the heated steel sheet is molded and cooled. The site heated to equal to or higher than the temperature of Ac3 point at which the metal structure of the steel material transforms into the austenite phase, is quenched so that the strength thereof is increased, and on the other hand, the strength of the site heated to the temperature of less than the temperature of Ac3 point and at which the transformation into the austenite single phase is not completed, is relatively lowered. As a result of this, it is possible to obtain a component having portions with different strengths (namely, a hot-stamped member), and further, it is also possible to make a difference in strengths between the portions with different strengths to be 150 Hv or more in terms of Vickers hardness (load F: 50 kgf, in which 1 kgf is about 9.8 N) defined by JIS Z 2244 (2009).

As described above, by using the fact that the heating rate is continuously changed by changing the film thickness of the surface-treated film, it is also possible to continuously change the hardness. At the site having a large film thickness of the surface-treated film, the austenitizing proceeds the most because of the large heating rate, and the strength is increased because of generation of martensite during quenching at the time of cooling. On the other hand, at the site with a small film thickness, an austenite phase ratio during heating becomes low, and when compared to the site with a large film thickness, a generation amount of martensite becomes small, which lowers the strength. Further, at the site that is not provided with the film, the austenite phase ratio during the heating is further lowered, and the generation amount of martensite is further reduced, which further lowers the strength.

As described above, by properly controlling the site to which the surface-treated film is provided and the film thickness of the surface-treated film, of the steel sheet for hot stamping according to the present embodiment, when manufacturing a hot-stamped member by using such a steel sheet for hot stamping, it is possible to separately form the portions with different strengths in an arbitrary manner.

<Hot-Stamped Member>

A hot-stamped member obtained in a manner as above has, on a surface of a steel sheet, a site having a surface-treated film, and a site at which the surface-treated film is not provided. Such a surface-treated film contains one or more of oxides selected from a group consisting of a Zr oxide, a Zn oxide, and a Ti oxide, in which an adhesion amount $X_{Oxide}$ of the oxides is 0.030 g/m$^2$ or more. Further, in such a surface-treated film, a silica content is 0 to 0.3 g/m$^2$. The carbon black existing in the surface-treated film of the steel sheet for hot stamping used as a material of the hot-stamped member, is eliminated by being subjected to a process of hot stamping, and the above-described metal oxides remain. The adhesion amount $X_{Oxide}$ of the oxides that exist in the surface-treated film of the hot-stamped member depends on the adhesion amount of the oxides in the surface-treated film of the steel sheet for hot stamping used as the material, and an upper limit value thereof is approximately 0.600 g/m².

In such a hot-stamped member, when a Vickers hardness (load F: 50 kgf, in which 1 kgf is about 9.8 N) defined by JIS Z 2244 (2009) is measured, a site indicating a maximum hardness HVmax and a site indicating a minimum hardness HVmin exist, and a hardness difference ΔHV between the maximum hardness HVmax and the minimum hardness HVmin is preferably 150 or more.

Here, as is apparent from the above explanation, both the site indicating the maximum hardness HVmax and the site indicating the minimum hardness HVmin exist within a region composed of a common material (namely, the steel sheet for hot stamping according to the present embodiment). Here, a "common member" indicates one in which a ratio of contents of specific elements (C, Si, Mn, P, S, Al, Ti, B, and N, for example) in a field of view of 0.05 mm in the vicinity of a center of a sheet thickness (a ratio between members) falls within a range of 0.80 times to 1.2 times at every spot. For example, one having the same composition when checked at a center of a sheet thickness and manufactured through the same manufacturing process, is the "common member" mentioned here. Note that such a common material may be composed of one piece of steel sheet, or it may be one obtained by joining a plurality of pieces of the same steel sheets (namely, the steel sheets for hot stamping according to the present embodiment) by some kind of method.

EXAMPLES

Hereinafter, examples of the present invention will be described, in which conditions in the examples are only conditional examples employed for confirming the operability and the effects of the present invention, and the present invention is not limited by the conditional examples. The present invention can employ various conditions as long as the object of the present invention is achieved without departing from the gist of the present invention.

As a base steel sheet, it is preferable to use a steel sheet having high mechanical strength (meaning various properties regarding mechanical deformation and fracture, such as tensile strength, a yield point, elongation, drawing, a hardness, an impact value, and fatigue strength). Chemical components of base steel sheets before plating, each used for a steel sheet for hot stamping described in the following examples, are shown in Table 1 below.

TABLE 1

| STEEL | CHEMICAL COMPONENT (mass %) BALANCE IS MADE UP OF IRON AND IMPURITIES. | | | | | | | | | | | | | | | | | | |
|---|---|---|---|---|---|---|---|---|---|---|---|---|---|---|---|---|---|---|---|
| No. | C | Si | Mn | P | S | Al | Ti | B | N | Cr | Cu | Ni | Nb | V | Mo | W | Sn | Ca | REM |
| S1 | 0.11 | 0.21 | 1.21 | 0.02 | 0.005 | 0.05 | 0.02 | 0.0030 | 0.005 | — | — | — | — | — | — | — | — | — | — |
| S2 | 0.40 | 0.01 | 1.01 | 0.04 | 0.010 | 0.03 | 0.04 | 0.0022 | 0.004 | — | — | — | — | — | — | — | — | — | — |
| S3 | 0.23 | 0.60 | 0.90 | 0.03 | 0.010 | 0.04 | 0.03 | 0.0022 | 0.003 | — | — | — | — | — | — | — | — | — | — |
| S4 | 0.31 | 0.01 | 0.50 | 0.04 | 0.010 | 0.04 | 0.04 | 0.0022 | 0.008 | — | — | — | — | — | — | — | — | — | — |
| S5 | 0.25 | 0.60 | 3.00 | 0.03 | 0.004 | 0.01 | 0.03 | 0.0030 | 0.003 | — | — | — | — | — | — | — | — | — | — |
| S6 | 0.27 | 0.21 | 1.01 | 0.05 | 0.004 | 0.01 | 0.02 | 0.0030 | 0.004 | — | — | — | — | — | — | — | — | — | — |
| S7 | 0.29 | 0.01 | 0.90 | 0.01 | 0.020 | 0.03 | 0.02 | 0.0030 | 0.009 | — | — | — | — | — | — | — | — | — | — |
| S8 | 0.34 | 0.60 | 1.01 | 0.01 | 0.004 | 0.10 | 0.02 | 0.0025 | 0.004 | — | — | — | — | — | — | — | — | — | — |
| S9 | 0.28 | 0.21 | 1.05 | 0.03 | 0.004 | 0.03 | 0.01 | 0.0029 | 0.005 | — | — | — | — | — | — | — | — | — | — |
| S10 | 0.26 | 0.23 | 0.90 | 0.04 | 0.004 | 0.03 | 0.10 | 0.0087 | 0.005 | 0.22 | — | 0.10 | — | — | — | — | — | — | — |
| S11 | 0.17 | 0.25 | 0.95 | 0.03 | 0.004 | 0.01 | 0.04 | 0.0001 | 0.003 | — | 0.002 | — | 0.04 | — | — | — | — | — | — |
| S12 | 0.33 | 0.21 | 2.01 | 0.04 | 0.004 | 0.01 | 0.03 | 0.0100 | 0.004 | 0.24 | 0.007 | — | — | 0.10 | — | — | — | — | — |
| S13 | 0.27 | 0.03 | 0.90 | 0.02 | 0.010 | 0.01 | 0.02 | 0.0048 | 0.010 | — | — | — | — | — | 0.11 | — | — | — | — |
| S14 | 0.37 | 0.01 | 0.95 | 0.02 | 0.010 | 0.03 | 0.02 | 0.0048 | 0.005 | — | — | — | — | — | — | 0.09 | — | — | — |
| S15 | 0.25 | 0.21 | 0.90 | 0.04 | 0.010 | 0.03 | 0.02 | 0.0029 | 0.008 | — | — | — | — | — | — | — | 0.10 | — | — |
| S16 | 0.33 | 0.12 | 0.50 | 0.04 | 0.008 | 0.04 | 0.04 | 0.0022 | 0.008 | 0.22 | — | — | — | — | — | — | — | 0.003 | — |
| S17 | 0.32 | 0.13 | 0.51 | 0.04 | 0.008 | 0.04 | 0.04 | 0.0022 | 0.008 | — | — | — | — | — | — | — | — | — | 0.10 |
| S18 | 0.30 | 0.14 | 0.53 | 0.04 | 0.009 | 0.04 | 0.04 | 0.0022 | 0.008 | 0.24 | — | — | — | — | — | — | — | — | — |

To each of the base steel sheets having the chemical components shown in Table 1 (steel Nos. S1 to S18), a surface-treated film was provided. More specifically, as illustrated in FIG. 2, in a steel sheet having a width of 100 mm×a length of 200 mm, and a sheet thickness of 1.2 mm, an upper half of 100 mm, out of 200 mm in the length direction, was provided with the surface-treated film on one side or both sides to be a film-present site, and the rest of 100 mm was not provided with the surface-treated film to be a film-absent site.

An aqueous treatment solution obtained by adding at least one or more of compounds such as commercially available carbon black, $TiO_2$, $ZrO_2$, ZnO, $Fe_2O_3$, $Fe_3O_4$, CuO, $SiO_2$, TiC, TiN, SiC, and SiN, in addition to an aqueous acrylic resin being a binder component, was applied onto a part of the base steel sheet using an industrial ink-jet printer, and then dried to provide the surface-treated film. Further, in some of the aqueous treatment solutions, silica was further contained, in addition to the above components. A film thickness of the surface-treated film was set to fall within a range of 1.0 to 2.5 μm, and when the film was provided on both sides, the same kind of film was provided on both sides.

Figure 2:
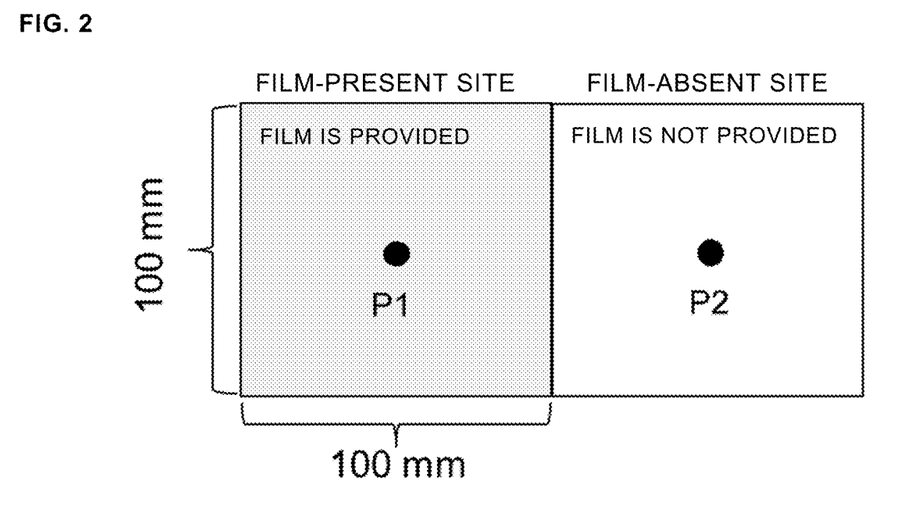
FIG. 2 is a view schematically illustrating a film-present site and its center portion (P1), and a film-absent site and its center portion (P2), at a surface of a steel sheet for hot stamping.

After that, a thermocouple was connected to each of a center portion (P1) of the site provided with the surface-treated film (film-present site) and a center portion (P2) of the site provided with no film (film-absent site) illustrated in FIG. 2, to thereby enable measurement of a temperature at each position. Further, the steel sheet was heated in an electric heating furnace at a set temperature of 900° C., and the steel sheet was taken out of the heating furnace at a point of time where the site provided with the film reached 880° C. The steel sheet was rapidly cooled by a flat metal mold, to thereby obtain a hot-stamped member. Note that the site provided with the surface-treated film (film-present site) described above corresponds to a site indicating the maximum hardness HVmax when measuring the Vickers hardness of the manufactured hot-stamped member, and the site at which the surface-treated film was not provided (film-absent site) described above corresponds to a site indicating the minimum hardness HVmin when measuring the Vickers hardness of the manufactured hot-stamped member.

A radiation thermometer was used to measure radiation intensity at the center portion P1 of the site provided with the surface-treated film at the wavelength of 8.0 μm at 25° C., and the emissivity (%) was calculated from a ratio with respect to radiation intensity of a blackbody.

Note that to some of the base steel sheets, Al-10 mass % Si plating, Zn plating, or Al plating was applied by a hot dipping method and then the above-described surface-treated film was provided, or Zn-3 mass % Ni plating was applied by an electroplating method and then the above-described surface-treated film was provided. In the case of the hot dipping method, the base steel sheet was immersed into a plating bath, and then an adhesion amount was adjusted to 70 g/m² per one side by a gas wiping method. In the case of the electroplating method, an adhesion amount per one side was adjusted to 20 g/m².

A film composition of the site provided with the surface-treated film, and a difference in Vickers hardness between P1 and P2 of the obtained hot-stamped member were examined, and in some of the examples, an appearance, paint adhesiveness, and post-painting corrosion resistance were further examined.

Evaluation methods regarding respective evaluation items are as follows.

(1) Strength Property
(Grade)
By using a method described in JIS Z 2244 (2009) of Japanese Industrial Standards, the Vickers hardness at the center portion P1 of the site provided with the surface-treated film and the Vickers hardness at the center portion P2 of the site at which the surface-treated film was not provided, were measured from a cross section of the steel sheet (load F: 50 kgf). The strength property was evaluated based on a hardness difference between P1 and P2, and a member whose hardness difference was Hv 150 or more was set to one having different strengths and thus having excellent strength property.

3: Vickers hardness difference ΔHV of Hv 200 or more
2: Vickers hardness difference ΔHV of Hv 150 or more and less than 200
1: Vickers hardness difference ΔHV of less than Hv 150

(2) Appearance
(Grade)
By using a method described in JIS Z 8781-4 (2013) of Japanese Industrial Standards, a CIE 1976 L*a*b* color space was measured at five locations, and a ratio of L* values (RL*=L* value 1/L* value 2) when comparing arbitrary two locations was evaluated.
2: 0.5 to 2.0
1: less than 0.5 or greater than 2.0

(3) Paint Adhesiveness
On the sample, phosphoric acid chemical treatment, and electrodeposition painting with a thickness of 15 μm were performed, and baking was performed at 170° C. for 20 minutes, to thereby provide a paint film. After that, the sample was immersed in deionized water at 60° C. for 200 hours, 100 cross-cuts with an interval of 1 mm were then cut by a cutter, and the number of peeled portions of the cross-cut portions were visually measured, to thereby calculate an area ratio of the peeled portion. The grading was performed based on the calculated area ratio.
(Grade)
3: Peeled area of 0% or more and less than 10%
2: Peeled area of 10% or more and less than 70%
1: Peeled area of 70% or more and 100% or less (4) Post-Painting Corrosion Resistance
The paint film provided similarly to (3) was provided with a flaw by means of a cutter, and the post-painting corrosion resistance was measured by a method defined by JASO M609 established by Society of Automotive Engineers of Japan. A width (maximum value on one side) of a paint film blister from the cut flaw after a corrosion test of 180 cycles was measured.
(Grade)
3: Blister width of 0 mm or more and less than 1.5 mm
2: Blister width of 1.5 mm or more and less than 3 mm
1: Blister width of 3 mm or more The evaluation results obtained by examples 1 to 4 performed under the above conditions, are shown in Tables 2, 3, 4, and 5, respectively.

EXAMPLE 1

In Table 2 below, A1 to A21 are invention examples, and a1 to a3 are comparative examples.

In the present example 1, when preparing the aqueous treatment solution, at least any of carbon black, titanium nitride, titanium carbide, titanium oxide, iron oxide, copper oxide, zirconium oxide, silicon nitride, cobalt oxide, and tin oxide was used as a compound other than the binder component. A total content of the compounds other than the binder component in the aqueous treatment solution was set to fall within a range of 2 to 50 vol % with respect to a volume of the entire solid content. The aqueous treatment solution whose solid content concentration was set to 10 to 40 mass % was applied onto the steel sheet so that a liquid film thickness became 3 μm to 25 μm, and then dried, to obtain a film. An atmosphere during the drying was set to an air or nitrogen atmosphere, and a temperature was set to 100 to 300° C. A total content of the compounds in the aqueous treatment solution corresponds to a total content of the compounds in the surface-treated film obtained after the drying. In the present example, the content of the compounds and the adhesion amount of the surface-treated film were adjusted, to thereby adjust the value of emissivity at the wavelength of 8.0 μm.

TABLE 2

| | | | | STEEL SHEET FOR HOT STAMPING | | | | | |
|---|---|---|---|---|---|---|---|---|---|
| | | | | CARBON BLACK | | METAL OXIDE | | | |
| | REFERENCE No. | STEEL No. | TYPE OF PLATING | ADHESION AMOUNT $X_{CB}$ [g/m²] | CONTENT [VOL %] | TYPE | ADHESION AMOUNT $X_{oxide}$ [g/m²] | CONTENT [VOL %] | MIDDLE SIDE OF EQUATION (1) |
| INVENTION EXAMPLE | A1 | S1 | Al-10 MASS % Si | 0.012 | 0.5 | $TiO_2$ | 0.012 | 0.15 | 119.0 |
| | A2 | S1 | Al-10 MASS % Si | 0.020 | 1.1 | $TiO_2$ | 0.006 | 0.10 | 119.0 |

TABLE 2-continued

| | | | | | | | | | |
|---|---|---|---|---|---|---|---|---|---|
| | A3 | S1 | Al-10 MASS % Si | 0.090 | 3.8 | $TiO_2$ | 0.190 | 2.38 | 128.4 |
| | A4 | S2 | Al-10 MASS % Si | 0.090 | 5.0 | $TiO_2$ | 0.060 | 1.00 | 123.2 |
| | A5 | S3 | Al-10 MASS % Si | 0.180 | 10.0 | $TiO_2$ | 0.060 | 1.00 | 125.6 |
| | A6 | S4 | Al | 0.450 | 11.0 | $TiO_2$ | 0.370 | 2.72 | 145.6 |
| | A7 | S5 | Al-10 MASS % Si | 0.850 | 20.2 | $TiO_2$ | 0.510 | 3.64 | 160.8 |
| | A8 | S6 | Zn-3 MASS % Ni | 1.104 | 40.0 | $TiO_2$ | 1.400 | 15.22 | 206.0 |
| | A9 | S7 | Al-10 MASS % Si | 3.000 | 119.0 | $TiO_2$ | 3.210 | 38.22 | 330.0 |
| | A10 | S8 | Al-10 MASS % Si | 0.010 | 0.3 | $TiO_2$ | 2.800 | 21.88 | 195.5 |
| | A11 | S9 | Al-10 MASS % Si | 0.180 | 10.0 | $ZrO_2$ | 1.550 | 25.83 | 177.3 |
| | A12 | S10 | Al-10 MASS % Si | 0.010 | 0.4 | $ZrO_2$ | 2.000 | 21.74 | 178.9 |
| | A13 | S1 | Al-10 MASS % Si | 0.030 | 1.3 | $ZrO_2$ | 1.830 | 22.88 | 176.2 |
| | A14 | S11 | Al-10 MASS % Si | 0.020 | 1.1 | $ZrO_2$ | 0.006 | 0.10 | 119.0 |
| | A15 | S12 | Al-10 MASS % Si | 0.020 | 0.8 | $ZrO_2$ | 0.190 | 2.38 | 126.2 |
| | A16 | S13 | Al-10 MASS % Si | 0.090 | 5.0 | $ZrO_2$ | 0.060 | 1.00 | 123.2 |
| | A17 | S14 | Al | 0.090 | 5.0 | $TiO_2$ | 0.060 | 1.00 | 123.2 |
| | A18 | S15 | NONE | 0.180 | 10.0 | ZnO | 0.370 | 6.17 | 138.1 |
| | A19 | S16 | Zn | 0.450 | 18.8 | ZnO | 0.510 | 6.38 | 151.5 |
| | A20 | S17 | Al-10 MASS % Si | 0.030 | 1.7 | ZnO | 0.030 | 0.50 | 120.2 |
| | A21 | S18 | Al-10 MASS % Si | 0.020 | 1.1 | ZnO | 0.020 | 0.33 | 119.6 |
| COMPARATIVE | a1 | S1 | NONE | 0.005 | 0.3 | NONE | 0.000 | 0.00 | 118.3 |
| EXAMPLE | a2 | S1 | Al-10 MASS % Si | 0.000 | 0.0 | $TiO_2$ | 0.005 | 0.06 | 118.4 |
| | a3 | S1 | Al-10 MASS % Si | 0.003 | 0.2 | $ZrO_2$ | 0.003 | 0.05 | 118.4 |

| | | STEEL SHEET FOR HOT STAMPING | | | HOT-STAMPED MEMBER | | | |
|---|---|---|---|---|---|---|---|---|
| | REFER-ENCE No. | Xoxide/ XCB | ADHESION AMOUNT OF SILICA [g/m$^2$] | EMISSIVITY OF FILM-PRESENT SITE [%] 25° C. | EMISSIVITY OF FILM-PRESENT SITE [%] 700° C. | STRENGTH PROPERTY | APPEAR-ANCE | PAINT ADHESIVENESS | POST-PAINTING CORROSION RESISTANCE |
| INVENTION | A1 | 1.00 | 0 | 60 | 60 | 2 | 1 | 3 | 3 |
| EXAMPLE | A2 | 0.31 | 0 | 63 | 58 | 2 | 1 | 3 | 3 |
| | A3 | 2.11 | 0 | 71 | 83 | 2 | 1 | 3 | 3 |
| | A4 | 0.67 | 0 | 78 | 65 | 3 | 2 | 3 | 3 |
| | A5 | 0.33 | 0 | 86 | 64 | 3 | 2 | 3 | 3 |
| | A6 | 0.82 | 0 | 92 | 72 | 3 | 2 | 3 | 3 |
| | A7 | 0.60 | 0 | 85 | 61 | 3 | 2 | 3 | 3 |
| | A8 | 1.27 | 0 | 90 | 80 | 3 | 2 | 3 | 3 |
| | A9 | 1.07 | 0 | 93 | 71 | 3 | 2 | 2 | 3 |
| | A10 | 280.00 | 0 | 71 | 71 | 3 | 2 | 3 | 3 |
| | A11 | 8.61 | 0 | 75 | 72 | 3 | 2 | 3 | 3 |
| | A12 | 200.00 | 0 | 86 | 64 | 3 | 2 | 3 | 3 |
| | A13 | 61.00 | 0 | 92 | 72 | 3 | 2 | 3 | 3 |
| | A14 | 0.31 | 0 | 85 | 61 | 3 | 2 | 3 | 3 |
| | A15 | 9.50 | 0 | 90 | 80 | 2 | 2 | 3 | 3 |
| | A16 | 0.67 | 0 | 86 | 64 | 2 | 2 | 3 | 3 |
| | A17 | 0.67 | 0 | 92 | 72 | 2 | 2 | 3 | 3 |
| | A18 | 2.06 | 0 | 85 | 61 | 2 | 2 | 3 | 2 |
| | A19 | 1.13 | 0 | 90 | 80 | 3 | 2 | 3 | 3 |
| | A20 | 1.00 | 0 | 67 | 65 | 2 | 2 | 3 | 3 |
| | A21 | 1.00 | 0 | 62 | 71 | 2 | 2 | 3 | 3 |
| COMPARATIVE | a1 | 0.00 | 0 | 58 | 54 | 1 | 2 | 3 | 1 |
| EXAMPLE | a2 | 0.00 | 0.1 | 56 | 56 | 1 | 2 | 3 | 3 |
| | a3 | 1.00 | 0.4 | 58 | 56 | 1 | 2 | 3 | 3 |

In the comparative examples a1 to a3, the emissivity of the film-present site P1 at the wavelength of 8.0 μm at 25° C. was small to be 58%, 56%, and 58%, respectively, and the hardness difference between the film-present site P1 and the film-absent site P2 of the hot-stamped member was less than ΔHV 150 in terms of Vickers hardness (grade 1). It can be inferred that, since the emissivity of the films of a1 to a3 at the wavelength of 8.0 μm at 25° C. was less than 60%, a large difference was not generated in the heating rate during the heating between the film-present site P1 and the film-absent site P2, and thus a difference of equal to or more than the Vickers hardness difference ΔHV 150 was not generated also in the structure of the hot-stamped member.

On the other hand, in the invention examples A1 to A21, the emissivity at the wavelength of 8.0 μm at 25° C. was 60% or more. As a result of this, the hardness difference between the film-present site and the film-absent site of the hot-stamped member became HV 150 or more and less than 200 in terms of Vickers hardness (grade 2).

EXAMPLE 2

In an invention example B1 in Table 3, the amount of carbon black (CB) was set to 2.7 vol % in the surface-treated film, and the amount of $TiO_2$ was set to 0.6 vol % in the surface-treated film. As a result of this, the emissivity of the film-present site at the wavelength of 8.0 μm at 25° C. became 86%, and the hardness difference between the film-present site and the film-absent site of the hot-stamped member became the Vickers hardness HV 150 or more and less than 200 (grade 2). Although the grade of the paint adhesiveness was 3, the grade of the appearance was 1. Further, in an invention example B2 in which the amount of carbon black was set to 4.0 vol % in the surface-treated film, and the amount of $TiO_2$ was set to 1.0 vol % in the surface-treated film, the emissivity of the film-present site at the wavelength of 8.0 μm at 25° C. became 80%, and the hardness difference between the film-present site and the film-absent site of the hot-stamped member became the Vickers hardness HV 150 or more and less than 200 (grade 2). In an invention example B5 in which the amount of carbon black was set to 58.3 vol % in the surface-treated film, and the amount of ZnO was set to 1.2 vol % in the surface-treated film, and an invention example B6 in which the amount of carbon black was set to 47.3 vol % in the surface-treated film, and the amount of ZnO was set to 1.0 vol % in the surface-treated film, the emissivity of the film-present site at the wavelength of 8.0 μm at 25° C. became 88% and 90%, respectively, and the grade of the appearance was 2. Further, the grade of the paint adhesiveness was 2.

On the other hand, in invention examples B3 and B4 in which the amount of carbon black was set to 5.0 vol % to 40.0 vol % in the surface-treated film, the emissivity of the film-present site at the wavelength of 8.0 μm at 25° C. became 82% and 86%, respectively, the hardness difference between the film-present site and the film-absent site of the hot-stamped member became the Vickers hardness HV 200 or more (grade 3), and besides, the grade of the appearance became 2, and the grade of the paint adhesiveness became 3.

From the above results, when the carbon black was contained by 5.0 vol % to 40.0 vol % as in the invention examples B3 and B4, it was possible to obtain a molded body excellent in not only the strength property but also the appearance and the paint adhesiveness.

TABLE 3

| | | | STEEL SHEET FOR HOT STAMPING | | | | | | |
|---|---|---|---|---|---|---|---|---|---|
| | | | | CARBON BLACK | | METAL OXIDE | | | |
| | REFERENCE No. | STEEL No. | TYPE OF PLATING | ADHESION AMOUNT $X_{CB}$ [g/m²] | CONTENT [VOL %] | TYPE | ADHESION AMOUNT $X_{oxide}$ [g/m³] | CONTENT [VOL %] | MIDDLE SIDE OF EQUATION (1) |
| INVENTION EXAMPLE | B1 | S1 | Al-10 MASS % Si | 0.029 | 2.7 | $TiO_2$ | 0.023 | 0.6 | 119.9 |
| | B2 | S5 | Al-10 MASS % Si | 0.029 | 4.0 | $TiO_2$ | 0.025 | 1.0 | 120.0 |
| | B3 | S6 | Zn | 0.024 | 5.0 | $ZrO_2$ | 0.028 | 1.8 | 120.0 |
| | B4 | S8 | Zn-3 MASS % Ni | 0.192 | 40.0 | $ZrO_2$ | 0.029 | 1.8 | 124.5 |
| | B5 | S10 | NONE | 0.35 | 58.3 | ZnO | 0.024 | 1.2 | 128.0 |
| | B6 | S13 | Al | 0.38 | 47.3 | ZnO | 0.028 | 1.0 | 128.8 |

| | | STEEL SHEET FOR HOT STAMPING | | | | | |
|---|---|---|---|---|---|---|---|
| | REFERENCE No. | Xoxide/ XCB | ADHESION AMOUNT OF SILICA [g/m²] | EMISSIVITY OF FILM PRESENT SITE [%] | | HOT-STAMPED MEMBER | |
| | | | | 25° C. | 700° C. | STRENGTH PROPERTY | PAINT APPEARANCE | ADHESIVENESS |
| INVENTION EXAMPLE | B1 | 0.79 | 0 | 86 | 60 | 2 | 1 | 3 |
| | B2 | 0.86 | 0 | 80 | 65 | 2 | 2 | 3 |
| | B3 | 1.00 | 0 | 32 | 67 | 3 | 2 | 3 |
| | B4 | 0.62 | 0 | 86 | 68 | 3 | 2 | 3 |
| | B5 | 0.07 | 0 | 88 | 66 | 3 | 2 | 2 |
| | B6 | 0.07 | 0 | 90 | 63 | 3 | 2 | 2 |

EXAMPLE 3

In Table 4, when compared to an invention example C1 in which the content of Zn oxide in the surface-treated film was set to 0.2 vol %, an invention example C2 in which the content of Ti oxide in the surface-treated film was set to 0.3 vol %, and an invention example C6 in which the content of Ti oxide in the surface-treated film was set to 37.5 vol %, by making the content of Ti oxide or Zr oxide in the surface-treated film to be 1.0 to 30.0 vol % as in invention examples C3 to C5, the hardness difference between the film-present site and the film-absent site of the hot-stamped member was further increased (grade 3). It can be considered that the hardness difference was increased because a radiation ratio of the oxide was larger than that of the compound at the surface of the steel sheet, and a heating rate difference with respect to the film-absent site was increased since an input heat amount with respect to the sample became large when reflection of infrared ray was prevented by the presence of interface between the surface of the steel sheet and oxide particles.

TABLE 4

| | Reference No. | Steel No. | Type of Plating | Steel Sheet for Hot Stamping | | | | |
|---|---|---|---|---|---|---|---|---|
| | | | | Carbon Black | | Metal Oxide | | |
| | | | | Adhesion Amount $X_{CB}$ [g/m²] | Content [vol %] | Type | Adhesion Amount $X_{oxide}$ [g/m²] | |
| INVENTION EXAMPLE | C1 | S1 | Al | 0.013 | 0.5 | ZnO | 0.012 | |
| | C2 | S5 | Al-10 mass % Si | 0.020 | 0.8 | TiO$_2$ | 0.020 | |
| | C3 | S6 | Al-10 mass % Si | 0.030 | 1.4 | TiO$_2$ | 0.070 | |
| | C4 | S8 | Zn | 0.090 | 2.5 | TiO$_2$ | 0.200 | |
| | C5 | S10 | Al-10 mass % Si | 0.180 | 3.7 | ZrO$_2$ | 3.600 | |
| | C6 | S13 | Al-10 mass % Si | 0.450 | 12.5 | TiO$_2$ | 4.500 | |

| | Reference No. | Steel Sheet for Hot Stamping | | | | | | Hot-Stamped Member Strength Property |
|---|---|---|---|---|---|---|---|---|
| | | Metal Oxide Content [vol %] | Middle Side of Equation (1) | $X_{oxide}/X_{CB}$ | Adhesion Amount of Silica [g/m²] | Emissivity of Film-Present Site [%] | | |
| | | | | | | 25° C. | 700° C. | |
| INVENTION EXAMPLE | C1 | 0.2 | 119.0 | 1.00 | 0 | 68 | 51 | 2 |
| | C2 | 0.3 | 119.6 | 1.00 | 0.1 | 71 | 56 | 2 |
| | C3 | 1.0 | 120.2 | 1.00 | 0 | 73 | 58 | 3 |
| | C4 | 1.7 | 123.2 | 0.67 | 0 | 82 | 61 | 3 |
| | C5 | 30.0 | 125.6 | 0.33 | 0.1 | 85 | 52 | 3 |
| | C6 | 37.5 | 142.5 | 0.67 | 0 | 89 | 63 | 2 |

EXAMPLE 4

In an invention example D1 in Table 5, the emissivity of the film-present site at the wavelength of 8.0 μm at 700° C. was 56%, and the hardness difference between the film-present site and the film-absent site of the hot-stamped member became the Vickers hardness HV 150 or more and less than 200 (grade 2). On the other hand, in each of invention examples D2 to D6 in which the emissivity of the film-present site at the wavelength of 8.0 μm at 700° C. was 60% or more, the hardness difference between the film-present site and the film-absent site of the hot-stamped member became the Vickers hardness HV 200 or more (grade 3).

TABLE 5

| | Reference No. | Steel No. | Type of Plating | Steel Sheet for Hot Stamping | | | | |
|---|---|---|---|---|---|---|---|---|
| | | | | Carbon Black | | Metal Oxide | | |
| | | | | Adhesion Amount $X_{CB}$ [g/m²] | Content [vol %] | Type | Adhesion Amount $X_{oxide}$ [g/m²] | |
| INVENTION EXAMPLE | D1 | S13 | Zn | 0.05 | 2.1 | TiO$_2$ | 0.02 | |
| | D2 | S5 | Zn | 0.05 | 1.7 | TiO$_2$ | 0.04 | |
| | D3 | S6 | Al-10 mass % Si | 0.15 | 4.2 | ZrO$_2$ | 0.05 | |
| | D4 | S5 | Al | 0.24 | 13.3 | ZnO | 0.05 | |
| | D5 | S10 | Al-10 mass % Si | 0.51 | 17.7 | ZnO | 0.05 | |
| | D6 | S1 | Al-10 mass % Si | 0.31 | 5.2 | ZnO | 0.05 | |

| | Reference No. | Steel Sheet for Hot Stamping | | | | | | Hot-Stamped Member Strength Property |
|---|---|---|---|---|---|---|---|---|
| | | Metal Oxide Content [vol %] | Middle Side of Equation (1) | $X_{oxide}/X_{CB}$ | Adhesion Amount of Silica [g/m²] | Emissivity of Film-Present Site [%] | | |
| | | | | | | 25° C. | 700° C. | |
| INVENTION EXAMPLE | D1 | 0.25 | 120.4 | 0.40 | 0 | 71 | 56 | 2 |
| | D2 | 0.42 | 121.2 | 0.80 | 0.1 | 82 | 60 | 3 |
| | D3 | 0.42 | 124.4 | 0.33 | 0 | 72 | 83 | 3 |
| | D4 | 0.83 | 126.6 | 0.21 | 0 | 82 | 65 | 3 |
| | D5 | 0.52 | 132.4 | 0.10 | 0 | 85 | 64 | 3 |
| | D6 | 0.25 | 128.3 | 0.16 | 0 | 79 | 72 | 3 |

EXAMPLE 5

In Table 6, as is apparent from a comparison between invention examples E1 to E5, and E6, although the post-painting corrosion resistance was "1" in the invention example E6 with no plating, in the invention examples E1 to E5 each provided with plating of Al-10 mass % Si or Zn-3 mass % Ni, the post-painting corrosion resistance was improved to "2" or "3".

TABLE 6

| | REFERENCE No. | STEEL No. | TYPE OF PLATING | CARBON BLACK ADHESION AMOUNT $X_{CB}$ [g/m²] | CARBON BLACK CONTENT [VOL %] | METAL OXIDE TYPE | METAL OXIDE ADHESION AMOUNT $X_{oxide}$ [g/m²] |
|---|---|---|---|---|---|---|---|
| INVENTION EXAMPLE | E1 | S1 | Al-10 MASS % Si | 0.09 | 2.5 | ZnO | 0.14 |
| | E2 | S1 | Zn-3 MASS % Ni | 0.18 | 7.5 | TiO₂ | 0.12 |
| | E3 | S1 | Al-10 MASS % Si | 0.45 | 14.4 | ZrO₂ | 0.15 |
| | E4 | S2 | Al-10 MASS % Si | 0.43 | 14.1 | ZrO₂ | 0.14 |
| | E5 | S3 | Al-10 MASS % Si | 0.61 | 12.7 | TiO₂ | 0.54 |
| | E6 | S4 | NONE | 0.55 | 45.8 | TiO₂ | 0.31 |

| | REFERENCE No. | STEEL SHEET FOR HOT STAMPING METAL OXIDE CONTENT [VOL %] | MIDDLE SIDE OF EQUATION (1) | ADHESION AMOUNT Xoxide/XCB | EMISSMTY OF FILM-PRESENT SITE [%] 25° C. | EMISSMTY OF FILM-PRESENT SITE [%] 700° C. | HOT-STAMPED MEMBER POST-PAINTING CORROSION RESISTANCE |
|---|---|---|---|---|---|---|---|
| INVENTION EXAMPLE | E1 | 1.17 | 126.4 | 1.56 | 0 | 63 | 71 | 2 |
| | E2 | 1.50 | 128.1 | 0.67 | 0 | 68 | 69 | 3 |
| | E3 | 1.44 | 135.8 | 0.33 | 0.1 | 86 | 73 | 3 |
| | E4 | 1.43 | 132.1 | 0.33 | 0 | 85 | 72 | 2 |
| | E5 | 3.38 | 156.8 | 0.89 | 0 | 76 | 86 | 3 |
| | E6 | 7.75 | 145.3 | 0.56 | 0 | 88 | 81 | 1 |

(Note: the second sub-table includes an "ADHESION AMOUNT OF SILICA [g/m²]" column; values for E1–E6 are 0, 0, 0.1, 0, 0, 0 respectively.)

As described above, according to the present invention, by providing the surface-treated film to the desired portion of the steel sheet and then performing the hot stamping, it was possible to form the portions with different strengths in the obtained hot-stamped member.

Preferred embodiments of the present invention have been described above in detail with reference to the attached drawings, but the present invention is not limited to the embodiments. It should be understood that various changes and modifications are readily apparent to those skilled in the art who has the common general knowledge in the technical field to which the present invention pertains, within the scope of the technical spirit as set forth in claims, and they should also be covered by the technical scope of the present invention.

INDUSTRIAL APPLICABILITY

According to the present invention, in the region provided with the surface-treated film whose emissivity at the wavelength of 8.0 μm at 25° C. is increased, it becomes possible to perform rapid cooling by increasing heat transfer by radiation. By differentiating the quenching properties, it is possible to provide, with the use of one steel sheet, the sites with different strengths in the hot-stamped member. Accordingly, the industrial applicability is high.

What is claimed is:

1. A steel sheet for hot stamping comprising, on a surface of the steel sheet:
   a site having a surface-treated film whose emissivity at a wavelength of 8.0 μm at 25° C. is 60% or more; and a site at which the surface-treated film is not provided, wherein:
   the surface-treated film contains carbon black, and one or more of a Zr oxide, a Zn oxide, and a Ti oxide, in which the carbon black and the oxides exist while being dispersed over the entire surface-treated film;
   wherein the surface-treated film contains the carbon black of 5.0 to 40.0 vol %,
   the surface-treated film has a silica content of 0 to 0.3 g/m2; and
   when an adhesion amount of the carbon black and an adhesion amount of the oxides are set to $X_{CB}$ (g/m2) and $X_{Oxide}$ (g/m2), respectively, an equation (1) below is satisfied, $$118.9 \leq 24280/\{6700/(100+76 \times X_{CB})+18000/(130+65 \times X_{Oxide})\} \leq 332.0 \qquad \text{Equation (1)}.$$

2. The steel sheet for hot stamping according to claim 1, wherein the surface-treated film contains the oxides of 1.0 to 30.0 vol %.

3. The steel sheet for hot stamping according to claim 1, wherein a ratio $X_{Oxide}/X_{CB}$ between the adhesion amount $X_{CB}$ (g/m2) of the carbon black and the adhesion amount $X_{Oxide}$ (g/m2) of the oxides is 0.20 or more and 200.00 or less.

4. The steel sheet for hot stamping according to claim 1, wherein the adhesion amount $X_{CB}$ of the carbon black is 0.030 g/m2 or more, and the adhesion amount $X_{Oxide}$ of the oxides is 0.030 g/m2 or more.

5. The steel sheet for hot stamping according to claim 1, wherein
an emissivity of the surface-treated film at a wavelength of 8.0 μm at 700° C. is 60% or more.

6. The steel sheet for hot stamping according to claim 1, wherein
on one side or both sides of the steel sheet for hot stamping, a metal-plated layer is provided between a base material of the steel sheet and the surface-treated film.

7. A hot-stamped member comprising, on a surface of a steel sheet:
a site having a surface-treated film; and a site at which the surface-treated film is not provided, wherein:
the surface-treated film contains one or more of a Zr oxide, a Zn oxide, and a Ti oxide, in which an adhesion amount $X_{Oxide}$ of the oxides is 0.030 g/m2 or more;
the surface-treated film has a silica content of 0 to 0.3 g/m2; and
the surface-treated film has a maximum Vickers hardness; when the Vickers hardness defined by JIS Z 2244 (2009) is measured, a site indicating a maximum hardness HVmax and a site indicating a minimum hardness HVmin exist, and a hardness difference ΔHV between the maximum hardness HVmax and the minimum hardness HVmin is 150 or more.

8. The hot-stamped member according to claim 7, wherein
both the site indicating the maximum hardness HVmax and the site indicating the minimum hardness HVmin exist within a region composed of a common material.

* * * * *